E. E. SHOOPMAN.
MACHINE FOR WRAPPING AND UNWRAPPING TIRES.
APPLICATION FILED MAY 13, 1920.
1,365,066.
Patented Jan. 11, 1921.
4 SHEETS—SHEET 4.
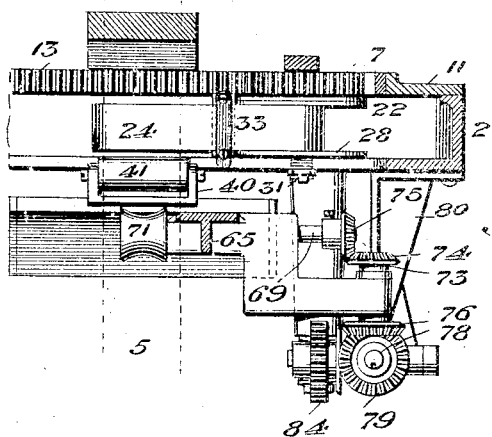
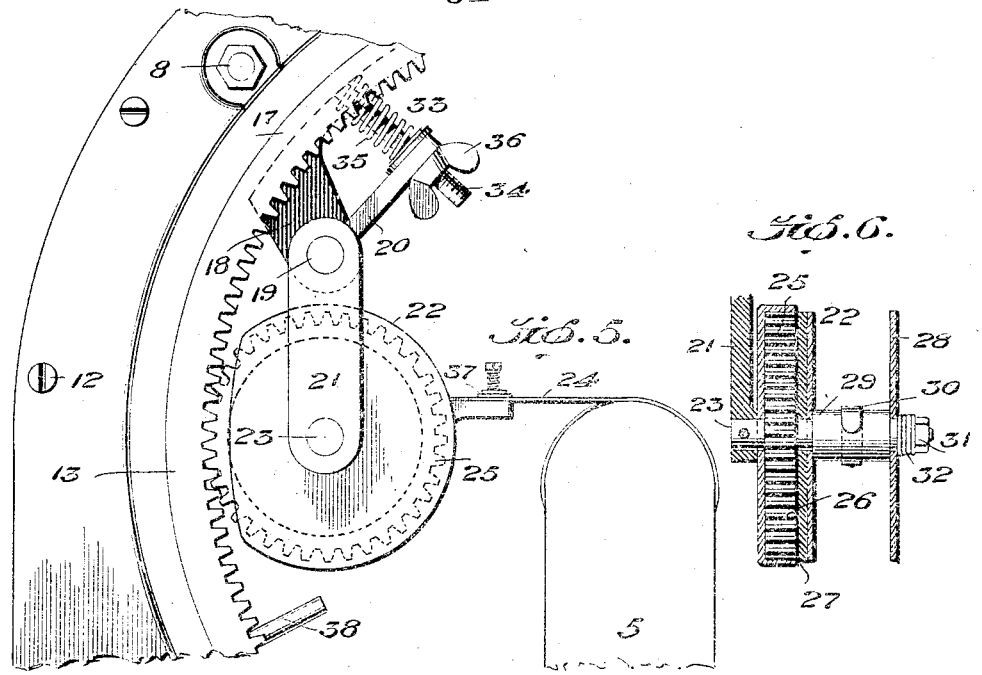

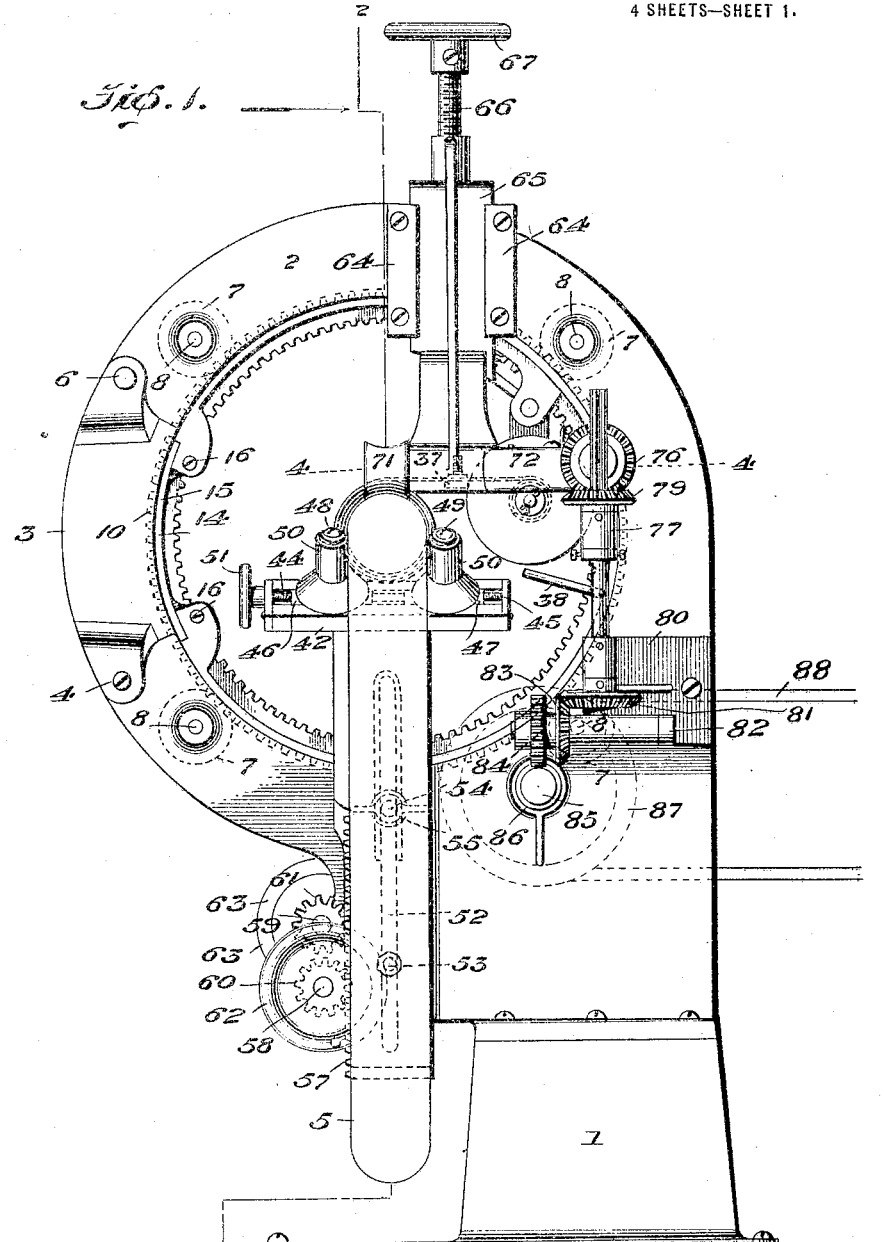

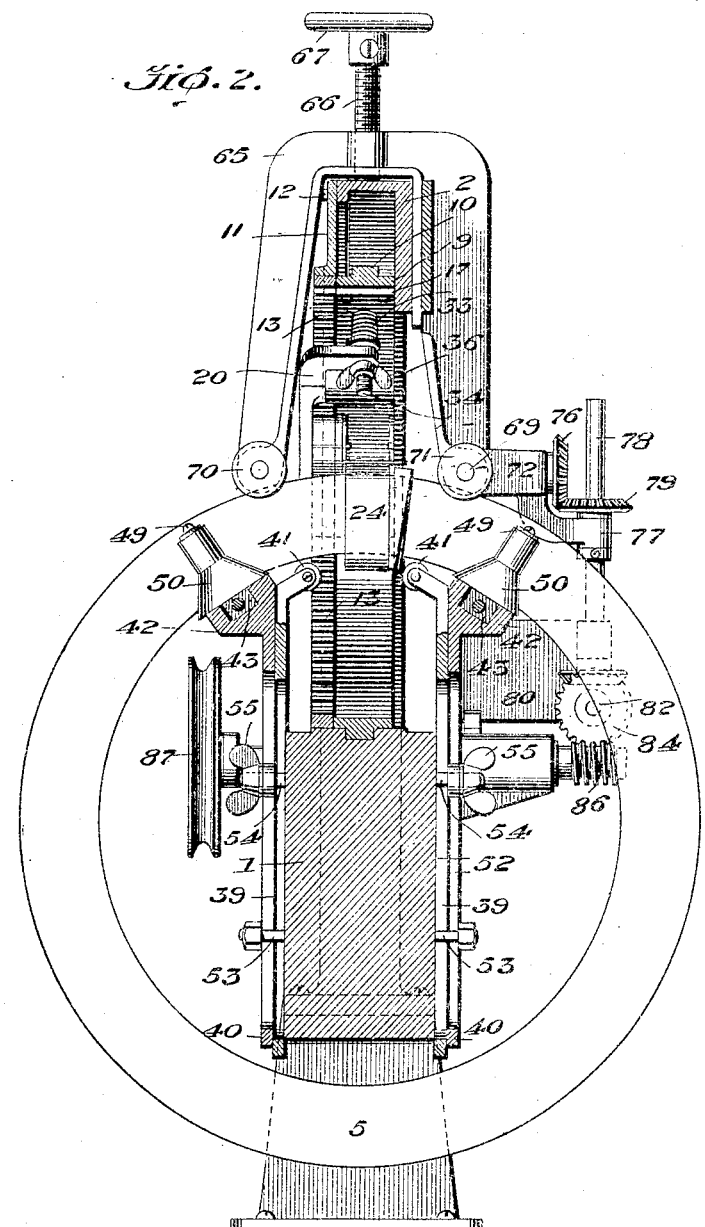

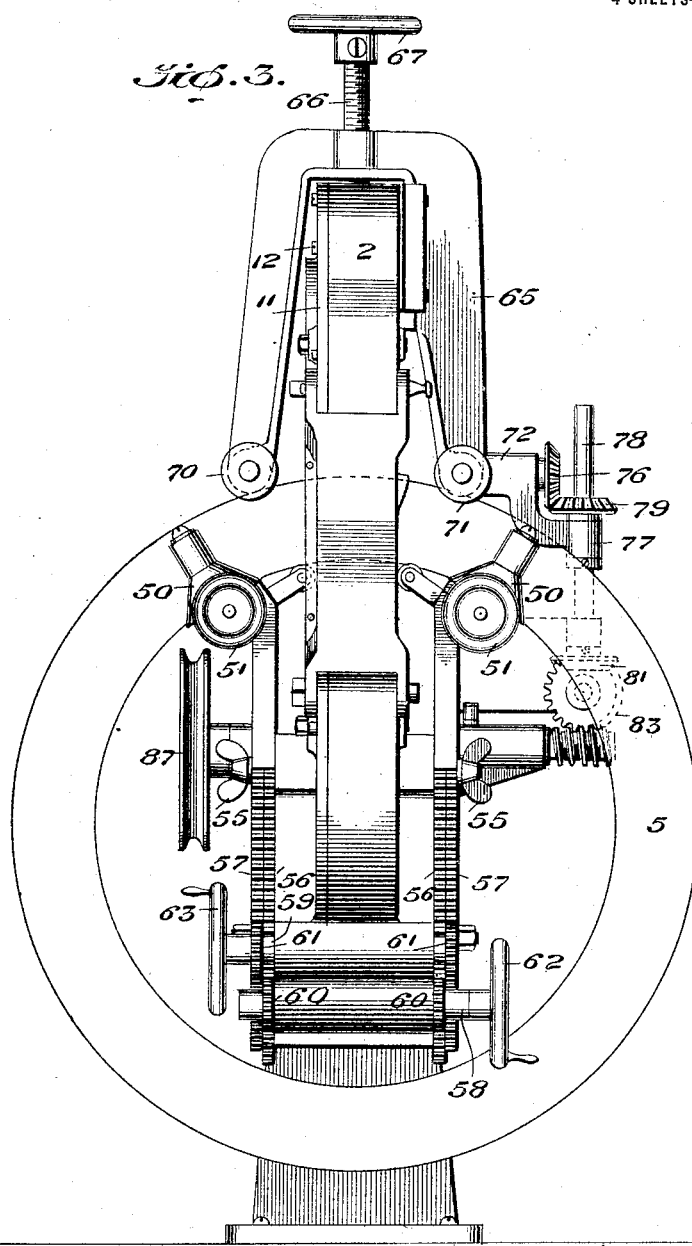

UNITED STATES PATENT OFFICE.

ELMER E. SHOOPMAN, OF CAIRO, NEBRASKA.

MACHINE FOR WRAPPING AND UNWRAPPING TIRES.

1,365,066. Specification of Letters Patent. Patented Jan. 11, 1921.

Application filed May 13, 1920. Serial No. 381,025.

*To whom it may concern:*

Be it known that I, ELMER E. SHOOPMAN, a citizen of the United States, residing at Cairo, in the county of Hall and State of Nebraska, have invented certain new and useful Improvements in Machines for Wrapping and Unwrapping Tires, of which the following is a specification.

This invention relates to machines for wrapping automobile, or other, tires with a tape of fiber or paper for their protection, or, for unwrapping the tape from a tire.

The present invention is an improvement on the machine set forth and claimed in my application filed July 16, 1919, Serial No. 311,267.

My object is to provide a novel machine adapted for wrapping the tape of fiber or paper on a tire or unwrapping it therefrom so that there will be combined in a single machine instrumentalities and combinations of devices to serve a purpose, by which operations which have heretofore required the use of three machines, may be carried on.

A further object is to provide a machine of the character set forth by which either a wrapping or an unwrapping operation may be carried on automatically, once the tire has been applied to the machine and the latter has been properly set.

Another object is to provide improvements whereby a tire of any size and diameter may be wrapped or unwrapped.

The present machine embodies improvements over the machine of my application Serial No. 331,267, mainly in the tire turning or feeding means; the tape reel and the means for operating said reel, and in the tire adjusting and supporting means.

A practical embodiment of the invention is described hereinafter and shown in the accompanying drawings but, as the different parts are susceptible of modification without departing from the essential principles of the invention, the disclosure is to be considered as illustrative instead of restrictive, of the scope of the invention.

In the accompanying drawings,

Figure 1 is a side elevation, showing a tire in position, illustrating how the wrapping operation is carried on;

Fig. 2 is a vertical section on the line 2—2 of Fig. 1;

Fig. 3 is a front elevation;

Fig. 4 is a detail horizontal section on the line 4—4 of Fig. 1;

Fig. 5 is an enlarged detail fragmentary view showing the reel in position for the operation of unwrapping a tire, and Fig. 6 is a detail section through the reel.

The frame 1 has a circular upper part 2 provided with a hinged section 3 which may be swung outwardly on the hinge bolt 4 to admit the tire 5 within the circular part 2. A removable locking bolt 6 secures the hinged section 3 in position.

The ring 2 is hollow and provided at intervals with grooved idlers 7 having spindles or shafts 8 carried by the ring 2.

A wrapping ring 9 bears on the idlers 7 and is provided with gear teeth 10 which are accommodated by the grooves in the idlers 7. The wrapping ring 9 is thus rotatably mounted inside the ring 2 of the frame.

Secured to the inner circular face of an annular removable plate 11 which is fastened to the ring 2 at 12 and constitutes one of the sides thereof, is an internal rack 13. The hinged section 3 has a gear segment 14 which completes the rack 13 when said section 3 is in position as shown in Fig. 1. However, when section 3 is swung on the hinge bolt 4, the segment 14 by its removal, leaves a gap and, consequently, there is a gap clear through the ring 2 when the section 3 is swung down.

The wrapping ring 9 has a removable section 15 which carries a section of the gear teeth 10. The section 15 is detachably held as a part of ring 9 by screws 16. To enable the tire 5 to be introduced within the ring 2 or removed therefrom, it is necessary to detach the section 15 by taking out the screws 16 and to swing down the section 3 to provide a gap clear through the rings 2 and 9.

Secured to the internal face of the ring 9 is a plate 17 which has a bearing arm 18 in which is mounted a stub shaft 19 which is integral with a bell crank comprising integral arms 20, 21, said bell crank being thus rockably mounted in the arm or bearing 18. The winding and unwinding reel shown generally at 22, Figs. 5 and 6, is carried by a spindle 23 which is secured to the arm 21. The reel is driven, or let off, under frictional action. This permits suitable slippage if the tension on the fiber or paper tape 24 becomes too great in the operation of unwrapping, and, similarly, in the operation of wrapping, the friction is sufficient to hold the tape suitably tight on the reel 22 and yet allow it to be unreeled during the wrapping operation in such manner that it will be laid firmly around the tire 5.

Mounted to turn on the spindle 23 is a gear 25 which is inclosed within a cup 26 fastened to the arm 21. Loose on the spindle 23 is a disk 27 which bears against the face of the gear 25. The reel proper comprises disks 28 loosely mounted on the spindle 23, one of said disks bearing on the disk 27 and being connected to the hub 29 which is provided with a clip 30 to hold the end of the tape 24. The other disk 28 is loose on the spindle 23 and bears against the end of the hub 29. A nut 31 on the end of the spindle and a coil spring 32 interposed between the nut and the loose disk 28, affords the necessary pressure for coupling up the different parts of the reel in a frictional manner for the purpose hereinbefore specified. The gear 25 is adapted to engage the internal gear rack 13, as shown in Fig. 5. This engagement may be permitted or prevented by adjusting the spring tension device 33, Figs. 2 and 5. The spring tension device 33 comprises a screw 34 secured to the plate 17 and passing loosely through the arm 20; a coil spring 35 surrounding the screw and interposed between the plate 17 and arm 20; and a thumb nut 36 on the screw which bears on the arm 20. By screwing up the nut 36, the spring 35 is placed under compression and the arm 21 of the bell crank lever is moved inwardly, causing the gear 25 to become disengaged from the internal rack 13. When a tire 5 is being wrapped, the gear 25 is out of mesh with the rack 13 so that the bodily rotation of the reel 22 with the ring 9 inside the ring 2, will cause the tape 24 to be wrapped around the tire. On the other hand, when it is desired to unwrap a tire, the tape 24 must be reeled up and this necessitates positively driving the reel 22. When a tire is to be unwrapped, the nut 36 is loosened, whereupon the spring 35 expands and swings the bell crank 20, 21 to cause the gear 25 to mesh with the rack 13. When the ring 9 is turned, the gear 25 is rotated, thus reeling up the tape 24 and removing it from the tire.

Secured to the disk 27 is a tension clamp 37 comprising a bracket and a spring-pressed foot or plate between which the tape 24 runs. A pin 38 is provided on the ring 9 to serve as a rest for the tension device 37 when the tape is off the reel 22.

On each side of the frame 1 is tire supporting and guiding means comprising in each instance vertically movable inner plates 39 and vertically movable outer plates 40. The plates 39 slide in channels in the inner faces of the plates 40 to preserve alinement and they are provided at their upper ends with rollers 41 on which the tire is adapted to rest as shown in Figs. 1 and 2. The plates 40 have heads 42 provided with channels 43. Journaled in the ends of the heads 42 are screws having right and left hand threads 44, 45 which respectively engage blocks 46, 47 adapted to slide in the channels 43. The blocks 46, 47 carry spindles 48, 49 on which are mounted idler spools 50 having cone shaped lower parts and cylindrical upper parts, respectively, adapted to bear against the inner and side parts of the tire 5. The screws 44, 45 have hand wheels 51 for turning them, by which means the guide rollers 50 may be adjusted toward or away from each other for the purpose of bearing snugly, yet easily, on the sides of the tire.

The plates 39, 40 are provided with slots 52 which are in alinement. The shanks of bolts 53 pass through the lower portions of the slots 52 and are secured to the frame 1. The nuts on said bolts are adapted to clamp the plates 39, 40 against the frame 1. Bolts 54 pass through the upper portion of the slots and are provided with wing nuts 55 for clamping the upper parts of the plates. The plates are provided with racks 56, 57 on their edges.

Journaled in the frame 1 are lower and upper shafts 58, 59, respectively, carrying pinions 60, 61 meshing with the racks 56, 57. Hand wheels 62, 63 are carried by the shafts. Means are thus provided for raising or lowering the inner plates 39, simultaneously by turning the hand wheel 62 and for simultaneously raising or lowering the outer plates 40 by turning the hand wheel 63. Any desired adjustment may thus be effected so that the supporting rollers 41 and the guide rollers 50 may be so arranged that the tire 5 will be firmly mounted and yet will have entire freedom to revolve.

Slidable in vertical guides 64 is a yoke 65 which may be raised or lowered by a screw 66 having a suitable hand wheel 67. Mounted in the lower ends of the yoke are shafts 68, 69, the former being an idler shaft and the latter a tire driving or turning shaft. The shafts carry grooved friction wheels or rollers 70, 71 which may be of any suitable material. Rubber wheels are shown as they will afford suitable friction on the tire 5 for the purpose of turning it, but other material could be used. The yoke 65 has a bracket 72 in which is journaled a short horizontal shaft 73 carrying a pinion 74 which meshes with a pinion 75 on shaft 69. The shaft 73 carries another pinion 76. Rotatable in a vertical bearing 77 of the bracket 72 is a vertical shaft 78 on which is loosely splined a pinion 79 which meshes with pinion 76. The shaft 78 is also journaled in a bracket 80 and it carries a pinion 81. In the bracket 80 is journaled a horizontal shaft 82 which carries a pinion 83 meshing with pinion 81. Shaft 82 carries a worm wheel 84. Journaled in a suitable bearing, carried by frame 1, is the horizontal driving shaft 85 which has a worm 86 which drives the worm wheel 84. Any suitable driving pulley, such as shown at 87, is carried by shaft 85. A belt 88 is shown in Fig. 1 for driving the pulley 87.

The shaft 85 has a pinion contained within frame 1 which meshes with the rack 10, thereby driving the wrapping ring 9 which carries the reel 22.

The tire having been placed in position, the rotation of shaft 85 through the intermediate gearing, turns the feeding wheel 71 which causes the tire to slowly revolve. The rotation of shaft 85 turns the wrapping ring 9 and as the reel 22 is carried by said ring, the reel will cause a wrapping or unwrapping of the tape 24 according as the gear 25 is out of mesh with rack 13, or, on the other hand, is in mesh with said rack, as previously explained. If the gear 25 is out of mesh with rack 13, the rotation of the ring 9 rapidly passes the reel through and over the tire 5, causing the tape 24 to be laid in spiral form around the tire. The frictional action of the reel 22 sufficiently checks the feed, as does also the device 37, to insure a tight wrapping of the tape.

If the tape is to be unwrapped from a tire, a free end of the tape is attached to the clip 30 and the nut 36 loosened to allow gear 25 to engage rack 13. The reel 22 is then driven to wind up the tape as the ring 9 turns.

What I claim is:—

1. In a machine for wrapping or unwrapping tires, the combination with means for supporting a tire from its inner part, of tire turning means bearing on the outer part of that section of the tire which is supported as aforesaid, said tire turning means being mounted for adjustment toward and away from the tire.

2. In a machine for wrapping or unwrapping tires, the combination of adjustable supporting means for a tire adapted for mounting it so that it may be turned, and adjustable means for turning the tire, the independent and relative adjustability of the two means aforesaid adapting the machine for the supporting and turning of tires of any size.

3. In a machine for wrapping and unwrapping tires, means for supporting a tire for turning, a slidable yoke, rollers carried thereby adapted to bear on the tire, means for adjusting said yoke, and gearing for driving one of said rollers to turn the tire.

4. In a machine for wrapping or unwrapping tires, the combination with a rotary ring having tire wrapping and unwrapping means, of two sets of tire supporting rollers adapted to engage the upper section of the tire, an adjustable yoke, two tire rollers carried thereby adapted to bear on the outer part of that section of the tire which is supported by the rollers aforesaid, and means for driving one of the yoke-carried rollers.

5. In a machine for wrapping or unwrapping tires, the combination with a rotary wrapping and unwrapping ring, of a bell crank lever pivoted to the ring, a tape reel carried by one arm of said bell crank lever and embodying a friction brake self-contained therewith which is operative at all times, said reel having a gear by which it may be driven while turning with said ring, screw means engaging the other arm of the bell crank lever and adapted for swinging the latter, and an internal circular rack adapted to be engaged by the gear, said screw means serving to cause engagement of the gear with the rack or its disengagement therefrom.

6. In a machine for wrapping or unwrapping tires, means for supporting a tire so that it may be turned, comprising adjustable slides to engage the inner part of the tire, and other adjustable slides having means to engage the sides of the tire.

7. In a machine for wrapping or unwrapping tires, means for supporting a tire so that it may be turned, comprising adjustable slides to engage the inner part of the tire, and other adjustable slides having means to engage the sides of the tire, said last named tire engaging means comprising guide rollers which are arranged in pairs and have adjusting devices whereby the members of each pair may be moved toward or away from each other to accommodate tires of different sizes.

8. In a machine for wrapping and unwrapping tires, tire supporting means comprising adjustable slides, pairs of guide rollers carried by said slides which are adapted to engage the sides and inner part of a tire to support the latter, and adjusting screws having right and left hand threaded sections engaging the supports for the rollers whereby said rollers may be moved toward or away from each other.

9. In a machine for wrapping or unwrapping tires, tire supporting means comprising adjustable slides each provided with a pair of rollers adapted to engage the sides and inner part of a tire to support and permit the latter to be turned thereon.

10. In a machine for wrapping or unwrapping tires, tire supporting means comprising pairs of slides the members of which are slidable one within the other, one pair of slides being arranged to bear on the inner part of a tire to support said tire, guides carried by the other pair of slides which are adapted to bear against the sides of a tire, means for adjusting the pairs of slides, and means for locking the pairs of slides where adjusted.

11. In a machine for wrapping or unwrapping tires, tire supporting means comprising pairs of slides the members of which are slidable one within the other, one pair of slides being arranged to bear on the inner part of a tire to support said tire, guides carried by the other pair of slides which are adapted to bear against the sides of a tire, each slide having a rack, a hand wheel shaft carrying pinions meshing with the racks of one pair of slides whereby said slides may be simultaneously adjusted, and a second hand wheel shaft having pinions meshing with the racks of another pair of slides, whereby the members of said last named pair of slides may be simultaneously adjusted, said pairs of slides being adapted for independent adjustment and setting.

In testimony whereof I affix my signature.

ELMER E. SHOOPMAN.